(12) United States Patent
Satterfield

(10) Patent No.: US 12,490,364 B2
(45) Date of Patent: Dec. 2, 2025

(54) MODULAR LIGHTING FIXTURE, SYSTEM, AND METHOD FOR OPTIMIZED PLANT GROWTH IN CONTROLLED ENVIRONMENTS

(71) Applicant: NEOTEK, INC., Midlothian, TX (US)

(72) Inventor: Lawrence Craig Satterfield, Midlothian, TX (US)

(73) Assignee: NEOTEK, INC., Midlothian, TX (US)

( * ) Notice: Subject to any disclaimer, the term of this patent is extended or adjusted under 35 U.S.C. 154(b) by 0 days.

(21) Appl. No.: 19/042,872

(22) Filed: Jan. 31, 2025

(65) Prior Publication Data

US 2025/0254776 A1  Aug. 7, 2025

Related U.S. Application Data

(60) Provisional application No. 63/548,890, filed on Feb. 2, 2024.

(51) Int. Cl.
*H05B 47/165* (2020.01)
*F21S 4/28* (2016.01)
(Continued)

(52) U.S. Cl.
CPC .............. *H05B 47/165* (2020.01); *F21S 4/28* (2016.01); *F21V 14/02* (2013.01); *F21V 17/12* (2013.01);
(Continued)

(58) Field of Classification Search
CPC ......... H05B 47/165; H05B 47/19; F21S 4/28; F21V 14/02; F21V 17/12; F21V 23/001;
(Continued)

(56) References Cited

U.S. PATENT DOCUMENTS 9,295,201 B2   3/2016   Bostdorff
9,756,794 B2   9/2017   Bostdorff
(Continued)

FOREIGN PATENT DOCUMENTS

CN   207316613 U   5/2018
CN   218820211 U   4/2023

OTHER PUBLICATIONS

Written Opinion of the International Searching Authority dated Apr. 4, 2025.

*Primary Examiner* — Christopher E Dunay
(74) *Attorney, Agent, or Firm* — Jacob M. Ward; Ward Law Office LLC

(57) ABSTRACT

A modular lighting fixture for controlled environment agriculture includes an elongate body with first and second connectors at opposite ends, and end plates having opposite low voltage charges. The fixture includes a beam removably coupled to the end plates via electrically conductive fasteners, with LED strips mounted to the beam and in wired electrical communication with the electrically conductive fasteners. A first power source powers the LED strips through the end plates, while a separate second power source operates a stroboscopic light source. The system enables easy LED strip interchangeability, adjustable beam angles for optimized light distribution, and dimming capabilities through a primary voltage circuit. The stroboscopic light source provides high-intensity illumination across an extensive spectrum range while operating at a reduced wattage.

20 Claims, 9 Drawing Sheets

(51) Int. Cl.
*F21V 14/02* (2006.01)
*F21V 17/12* (2006.01)
*F21V 23/00* (2015.01)
*F21V 23/02* (2006.01)
*F21V 23/04* (2006.01)
*F21V 23/06* (2006.01)
*F21V 33/00* (2006.01)
*H05B 45/10* (2020.01)
*H05B 47/19* (2020.01)
*F21Y 115/10* (2016.01)

(52) U.S. Cl.
CPC .......... *F21V 23/001* (2013.01); *F21V 23/023* (2013.01); *F21V 23/0435* (2013.01); *F21V 23/0442* (2013.01); *F21V 23/06* (2013.01); *F21V 33/006* (2013.01); *H05B 45/10* (2020.01); *H05B 47/19* (2020.01); *F21Y 2115/10* (2016.08)

(58) Field of Classification Search
CPC .............. F21V 23/023; F21V 23/0435; F21V 23/0442; F21V 23/06
See application file for complete search history.

(56) References Cited

U.S. PATENT DOCUMENTS

| | | | |
|---|---|---|---|
| 10,113,721 B1 | 10/2018 | Lin | |
| 11,959,631 B2* | 4/2024 | Wassel | ..................... F21S 8/026 |
| 2015/0305108 A1 | 10/2015 | Probasco | |
| 2019/0098723 A1* | 3/2019 | Sadwick | ............ H05B 45/3578 |
| 2020/0116319 A1* | 4/2020 | Gallo, Jr. | ............ F21V 23/0435 |
| 2021/0029793 A1 | 1/2021 | Cai et al. | |
| 2021/0262651 A1 | 8/2021 | Pahlevaninezhad et al. | |
| 2023/0397542 A1* | 12/2023 | Satterfield | .............. H05B 47/16 |
| 2023/0408070 A1* | 12/2023 | Beland | ................. F21V 21/048 |
| 2025/0027624 A1* | 1/2025 | Bretschneider | ..... H01L 25/0753 |

* cited by examiner

MODULAR LIGHTING FIXTURE, SYSTEM, AND METHOD FOR OPTIMIZED PLANT GROWTH IN CONTROLLED ENVIRONMENTS

CROSS-REFERENCE TO RELATED APPLICATIONS

This application claims the benefit of U.S. Provisional Application No. 63/548,890, filed on Feb. 2, 2024. The entire disclosure of the above application is incorporated herein by reference.

FIELD

The present technology relates to a modular lighting fixture, system, and method for plant growth, more specifically, ways of optimizing plant growth via integration of LED components with a stroboscopic light source.

INTRODUCTION

This section provides background information related to the present disclosure which is not necessarily prior art.

In a controlled environment agriculture (CEA), lighting is an important factor for achieving plant growth and development. An agricultural lighting system relies on a fixed lighting setup providing a constant light source such as a high-pressure sodium lamp and a metal halide fixture. While the system is widely used in industry, the system presents challenges, including high energy consumption which increases operational costs and contributes to a larger carbon footprint.

The fixed lighting setup offers little flexibility to cater to the diverse light requirements of different plant species or to adjust for various growth stages of the plants. The one-size-fits-all approach results in suboptimal growth conditions, leading to reduced plant health and yield. Moreover, the inability to adjust light intensity and direction means that light distribution is often uneven, with some plants receiving excessive light while others are left in relative shade.

The maintenance and operational complexity of the lighting system poses challenges. Replacing or upgrading components often requires extensive rewiring and technical expertise, which can be time-consuming and costly. The complexity of replacement or upgrading hinders the ability of CEA operations to quickly adapt to new technologies or to scale up the system in response to changing market demands or advances in agricultural science.

Additionally, the heat generated by the lighting system can be detrimental to plant health and can complicate environmental control within the CEA facility. Excessive heat can lead to water loss, stress, and even damage to the plants, necessitating an additional cooling system to maintain optimal growing conditions, not only adding to the energy burden but also complicating the overall management of the agricultural environment.

Furthermore, the static nature of the lighting system fails to take advantage of the dynamic light patterns found in natural environments, such as the dappled light that occurs under a canopy of leaves, known as sunfleck. It has been shown that dynamic lighting can have beneficial effects on plant growth, yet the phenomenon is largely unexploited in existing CEA lighting solutions.

Accordingly, there is a continuing need for a modular lighting fixture, system, and method that offers a versatile, energy-efficient, and highly customizable lighting solution that is optimized for the demands of CEA.

SUMMARY

In concordance with the instant disclosure, a modular lighting fixture, system, and method that offers a versatile, energy-efficient, and highly customizable lighting solution that is optimized for the demands of CEA, has surprisingly been discovered.

The present technology includes articles of manufacture, systems, and processes that relate to an agricultural lighting system. More specifically, the present technology pertains to a modular lighting fixture and associated system for use in controlled environment agriculture (CEA). The fixture associated with the system can include an adjustable and interchangeable light-emitting diode (LED), integrated with a pulsed light source, to provide light management for plant growth, development, and maturation.

In certain embodiments, a modular lighting fixture for controlled environment agriculture can include an elongate body, end plates, a beam, an LED strip, a first power source, a stroboscopic light source, and a second power source. The elongate body can have a first connector disposed at a first end and a second connector disposed at a second end. The end plates can include a first end plate and a second end plate disposed adjacent to opposite ends of the elongate body. The first connector can be disposed through the first end plate and the second connector can be disposed through the second end plate. The first end plate can be in wireless electrical communication with the first connector and the second end plate can be in wireless electrical communication with the second connector. The end plates can have a low voltage charge. The first end plate can have an opposite charge of the second end plate. The beam can be removably coupled to the first end plate and the second end plate via a fastener. The fastener can be in wireless electrical communication with the end plates. The LED strip can be mounted to the beam and can be in wired electrical communication with the fastener. The first power source can be in wired electrical communication with the first connector and the second connector. The first power source can power the LED strip. The stroboscopic light source can be disposed adjacent to the elongate body and the second power source can be in wired electrical communication with the stroboscopic light source.

In certain embodiments, a system for optimizing plant growth in CEA includes a at least one modular lighting fixture, a controlled network, and a user interface. Each of the at least one modular lighting fixtures can be as described herein. The control network can be configured to operate the at least one modular lighting fixture. The user interface can be communicatively coupled to the control network. The user interface can be configured to allow user control over an operation of the at least one modular lighting fixture.

In certain embodiments, a method for optimizing growth of a plant in a CEA using a modular lighting fixture can include providing a modular lighting fixture as described herein. The method can include at least of adjusting the angle of the beam, interchanging the LED strip, dimming the LED strip, and operating the stroboscopic light source. Each of these steps can permit for the modular lighting fixture to optimize plant growth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

Figure 1:
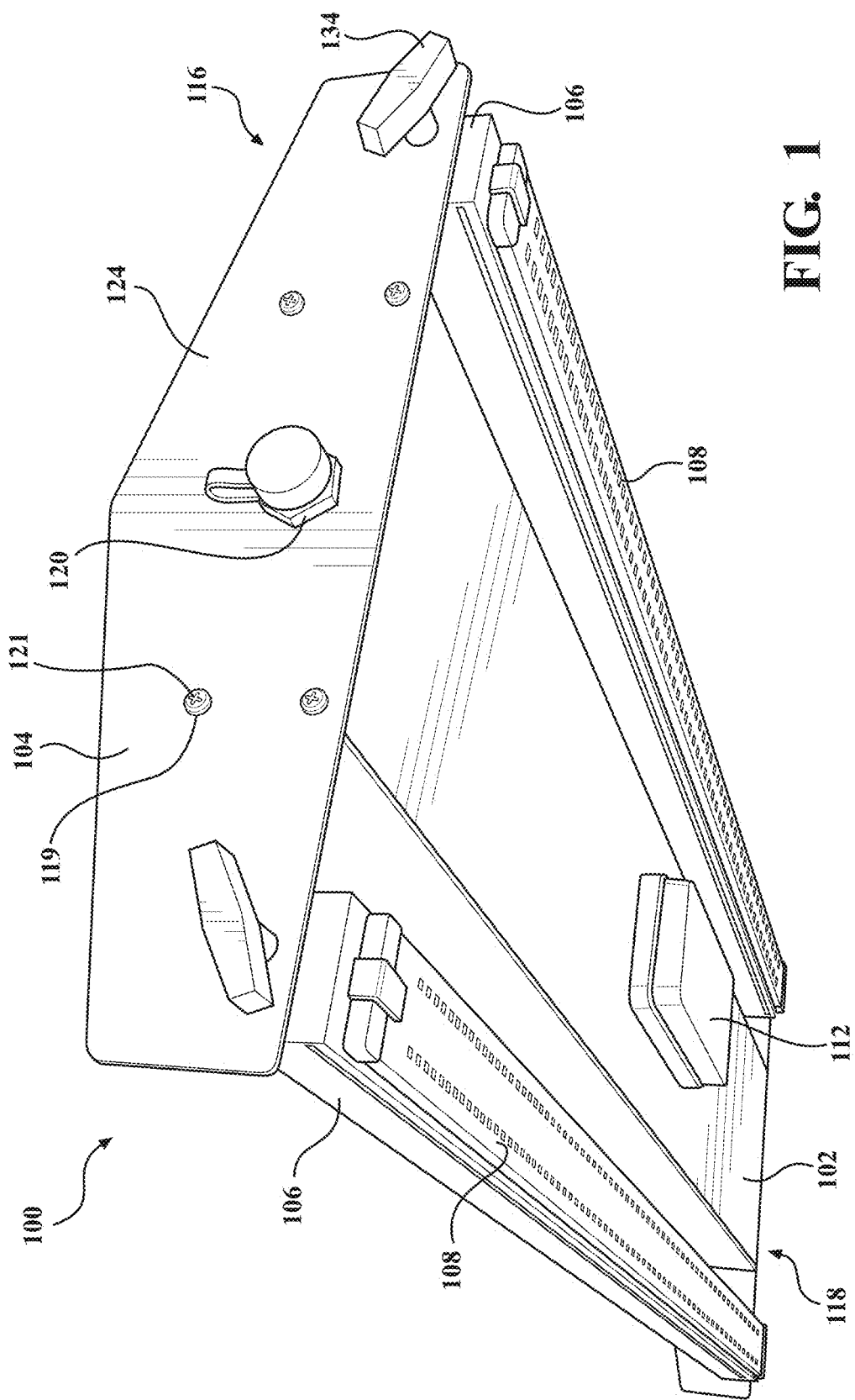
FIG. 1 is a bottom perspective view of a modular lighting fixture.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves upon agricultural lighting solutions by including a modular lighting fixture that is customizable, energy-efficient, and adaptable to a wide range of controlled environment agriculture (CEA) conditions. With features such as an adjustable beam for mounting lights, interchangeable light components for spectrum customization, and a stroboscopic light source for high-intensity illumination such as a pulsed Xenon light source, the present technology offers an approach to optimizing plant growth. The integration of a control system that adjusts light output and flash frequency based on plant growth cycles, along with the ability to operate at lower wattages, provides a sustainable and advanced solution for modern agricultural practices. The modular lighting fixture can incorporate the lighting systems as disclosed in U.S. Pat. Nos. 9,756,794 B2 and 9,295,201 B2 to Bostdorff, which are herein incorporated by reference in their entireties.

Figure 7:
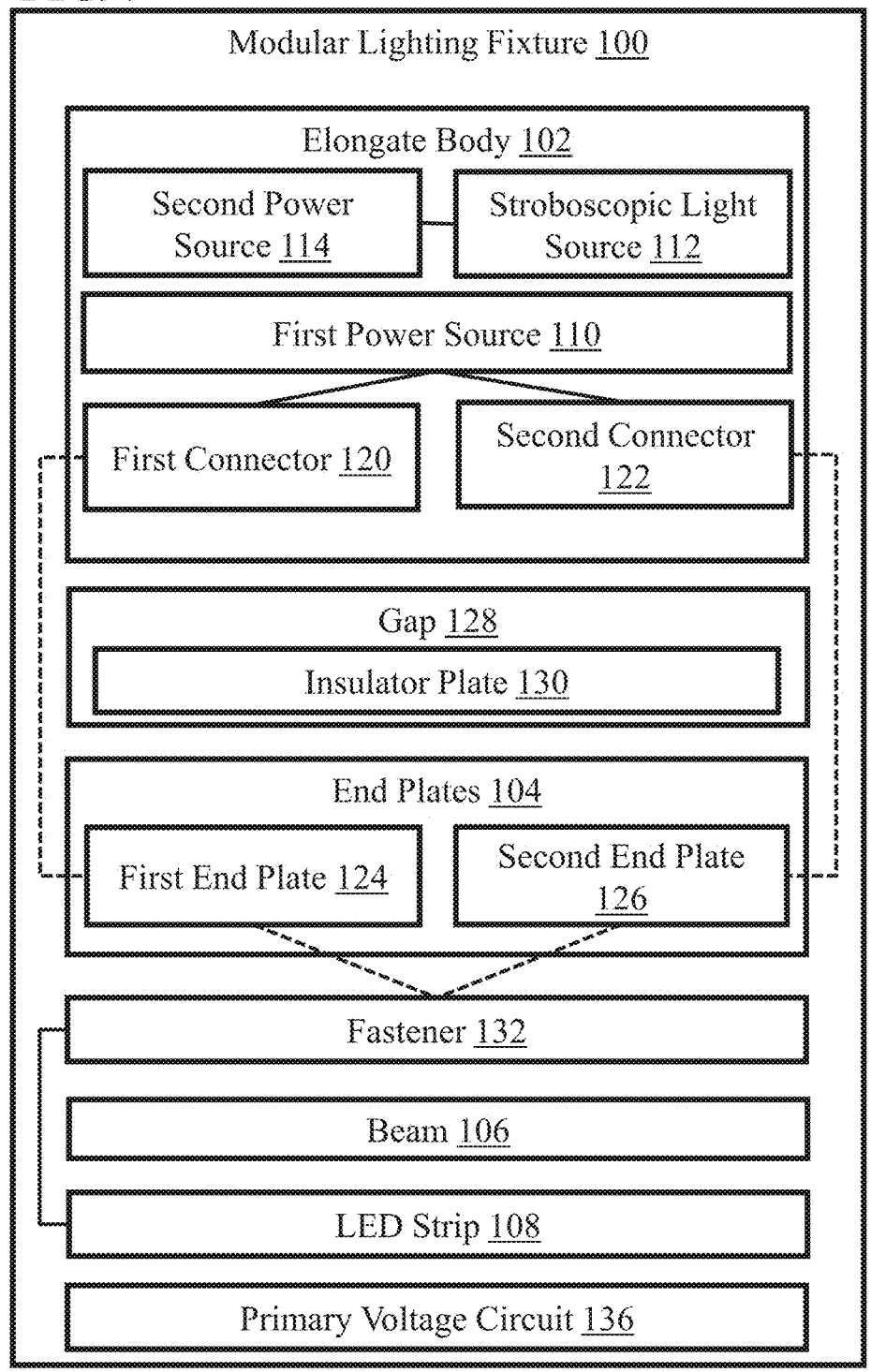
FIG. 7 is a schematic depicting the modular lighting fixture.

As used herein, "wired electrical communication" can mean a direct physical connection between components using electrical conductors such as a power wire, where electrical current flows through the physical wire connection. For example, the wired electrical connection can be achieved using a 14-gauge power wire connecting one component of the modular light fixture to another component of the modular light fixture. FIG. 7 depicts the wired electrical communication as a solid line. A skilled artisan can select a suitable power wire within the scope of the present disclosure.

As used herein, "unwired electrical communication" can mean the transmission of an electrical current between components through conductive metal-to-metal contact points without the use of wiring. Components in unwired electrical communication can create a complete circuit through direct metal contact points, enabling electrical flow from a positively charged component through a conductive component and back to a negatively charged component. FIG. 7 depicts the unwired electrical communication as a dashed line.

The present disclosure provides a modular lighting fixture 100 for CEA including an elongate body 102, end plates 104, a beam 106, a light emitting diode (LED) strip 108, a first power source 110, a stroboscopic light source 112, and a second power source 114, as shown generally in FIGS. 1-7. It should be appreciated that the first power source 110, the end plates 104, and the LED strip 108 form one electrical circuit, while the second power source 114 and the stroboscopic light source 112 form another electrical circuit.

Figure 2:
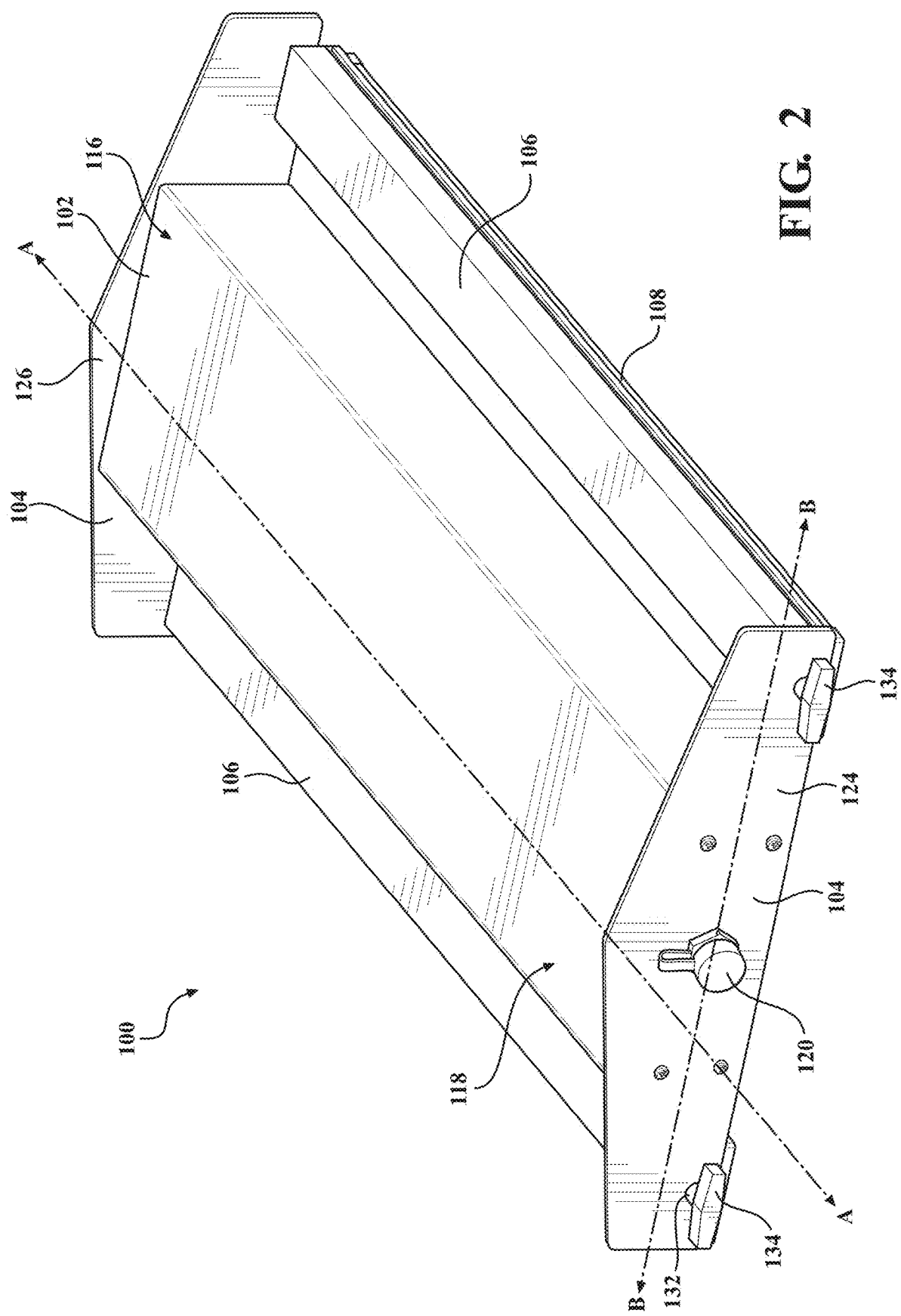
FIG. 2 is a top perspective view of the modular lighting fixture.
Figure 3A:
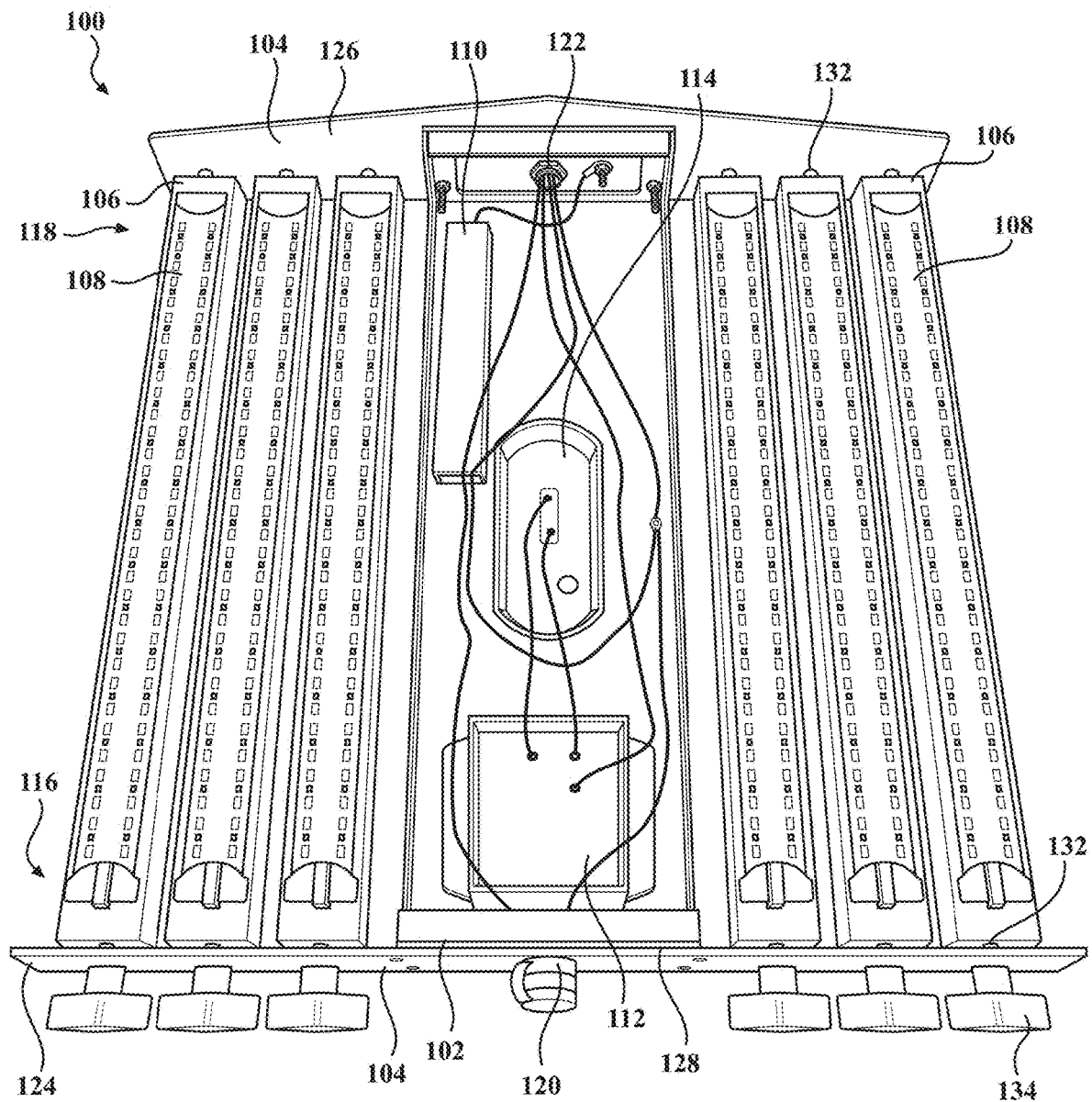
FIG. 3A is a top perspective view of another embodiment of the modular lighting fixture including an LED strip mounted to a beam and depicting an interior of an elongated body for housing a first power source, a second power source, and a stroboscopic light source.
Figure 3B:
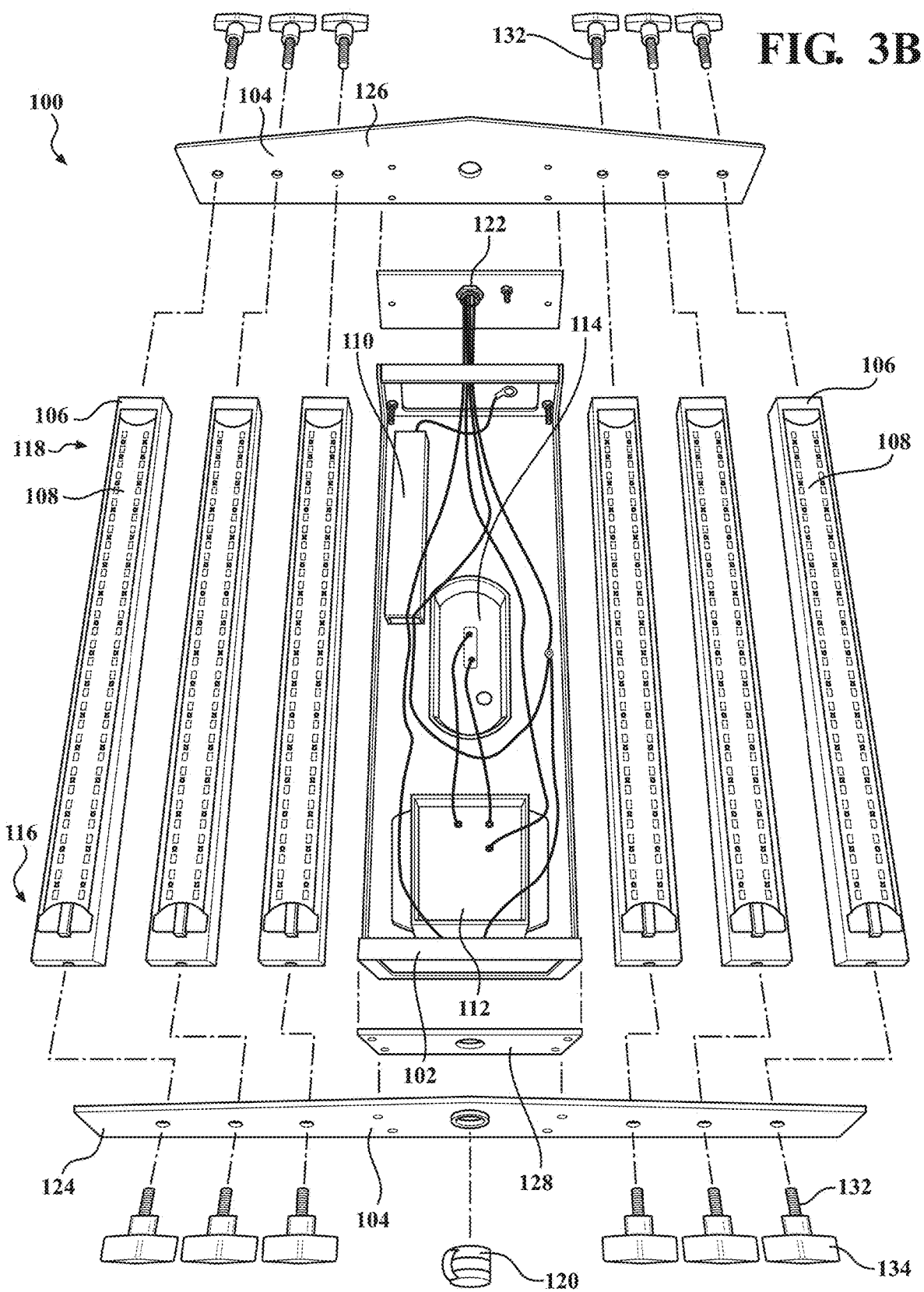
FIG. 3B is an exploded top perspective view of another embodiment of the modular lighting fixture including an LED strip mounted to a beam and depicting an interior of an elongated body for housing a first power source, a second power source, and a stroboscopic light source.

With reference to FIGS. 2-3, the elongate body 102 can include a first end 116 and a second end 118 disposed opposite the first end 116. The first end 116 can include a first connector 120 and the second end 118 can include a second connector 122, as shown in FIG. 3. The elongate body 102 can be constructed with a substantially rectangular cross-section. However, it should be appreciated that the elongate body 102 can have any shape suitable to correspond with the modular lighting fixture 100, as desired. The elongate body 102 can also include a hollow interior 103, providing a housing solution for various internal components of the modular lighting fixture 100 and also shown in FIG. 3. The hollow interior 103 can provide storage and protection of certain components within the elongate body 102, including the stroboscopic light source 112 and associated power source components.

The elongate body 102 can be fabricated from a rigid and durable material suitable for agricultural environments, with all surfaces being powder coated for protection and to militate against electrical shock. Powder coating can serve multiple functions in an electrical application by providing an electrically insulating layer that helps with militating against current leakage and militating against electrical shorts, while simultaneously offering protection against corrosion and environmental factors commonly present in a CEA setting. The protective coating can be important given that the modular lighting fixture 100 must maintain electrical isolation between various components, such as a gap between the end plates 104 and the elongate body 102.

It should be appreciated that the powder coating process creates a uniform, durable finish that helps maintain an IP67 rating of the modular lighting fixture 100, promoting protection against dust and moisture intrusion that could otherwise compromise the electrical components housed within the elongate body 102. The protective layer also helps maintain the electrical isolation necessary between the elongate body 102 and the end plates 104, which facilitates the function of the modular lighting fixture 100. The elongate body 102 can also incorporate a heat dissipation mechanism for managing the thermal output from both the LED strip 108 and the stroboscopic light source 112, promoting the longevity and performance of the modular lighting fixture 100.

It should be appreciated that each end 116, 118 of the elongate body 102 and each end plate 104 can include an opening 119 for a connecting means 121 that couple the elongate body 102 and the end plates 104, as shown in FIG. 1. The opening 119 can be insulated to allow for the connecting means 121 to couple the end plates 104 and the elongate body 102 without conducting electricity between the electrically charged end plates 104 and the electrically neutral elongate body 102. As an example, the opening 119 can be insulted using a non-conductive nylon material. A skilled artisan can select a suitable insulation material for the opening 119 within the scope of the present disclosure.

With continued reference to FIG. 2, the elongate body 102 can be disposed between the end plates 104. The elongate body 102 can be coupled to the end plates 104 via the connecting means 121 and the connectors 120, 122. The end plates 104 can include a first end plate 124 and a second end plate 126 disposed adjacent to opposite ends of the elongate body 102. The first end plate 124 and the second end plate 126 can be disposed along a longitudinal axis (A) of the elongate body 102 such that a longitudinal axis (B) of each end plate 104 is disposed perpendicular to the longitudinal axis (A) of the elongate body 102, as shown in FIG. 2. The elongate body 102 can also be disposed centrally on each end plate 104 such that the elongate body 102 and the end plates 104 form an I-shaped structure, as shown in FIG. 3.

The end plates 104 of the modular lighting fixture can include a positive low voltage (LV) end plate and a negative LV end plate, such that the first end plate 124 can have an opposite charge than the charge of the second end plate 126. As an example, the first end plate 124 can include the positive LV end plate and the second end plate 126 can include the negative LV end plate. It should be appreciated that a skilled artisan can select a suitable configuration for the end plates 104 within the scope of the present disclosure. In operation, the first power source 110 can be in wired electrical communication with the first connector 120 and the second connector 122. The first power source 110 can provide a positive charge to the first connector 120. The first connector 120 can be in wireless electrical communication with the first end plate 124 providing a positive charge to the first end plate 124. The first power source 110 can provide a negative charge to the second connector 122. The second connector 122 can be in wireless electrical communication with the second end plate 126 providing a negative charge to the second end plate 126.

In certain embodiments, the modular lighting fixture can include a gap 128 between each of the end plates 104 and the elongate body 102, as shown in FIG. 7. For example, the gap 128 can be about 1/16" (0.0625 inches) space defined between each of the end plates 104 and elongate body 102. A skilled artisan can select other suitable arrangements, including thicknesses of the gap 128, within the scope of the present disclosure. An insulator plate 130 can be disposed within the gap 128 for keeping the elongate body 102 electrically insulated from the end plates 104. It should be appreciated that the gap 128 and insulator plate 130 have a thickness of about 1/16" inches or less. In this way, the insulator plate 130 may not be visible in operation. As an example, the insulator plate 130 can be formed from a material that does not conduct electricity, such as plastic. A skilled artisan can select a suitable material for the insulator plate 130 within the scope of the present disclosure. Electrical isolation of the elongate body 102 is important for allowing the modular lighting fixture 100 to maintain the opposite charges at the end plates 104 to power the LED strip 108. The elongate body 102 should remain electrically neutral and isolated to militate against interference with the power distribution system.

With renewed reference to FIG. 3, the first connector 120 can be disposed through the first end plate 124 and the second connector 122 can be disposed through the second end plate 126. The first end plate 124 can be in wireless electrical communication with the first connector 120 and the second end plate 126 can be in wireless electrical communication with the second connector 122. However, it should be appreciated that an exterior surface in contact with the elongate body 102 can include an insulator to militate against electrical charge in each connector 120, 122 to electrically charge the elongate body 102. As described herein, the connecting means 121 can be insulated from the electrical circuit via an insulator disposed in the opening 119. It should be understood that the insulator plate 130, the powder coating, connecting means 121, and the connectors 120 can cooperate to provide secure attachment of the end plates to the elongate body 102 while maintaining the electrical isolation of the end plates 104 from the elongate body 102. As described herein, the first power source 110 can be in wired electrical communication with the first connector 120 to provide each of the first connector 120 and the second connector 122 with a positive or negative charge, respectively. The end plates 104 can be coupled to the elongate body 102 via the connectors 120, 122 at each end 116, 118, with the first end plate 124 and second end plate 126 maintaining opposite charges to create the electrical potential for powering the LED strip 108. The configuration allows the first power source 110 to be in electrical communication with the LED strip 108 through the end plates 104, while remaining separate from the second power source 114 that operates the stroboscopic light source 112. The configuration further allows for the connector 120, 122 to provide wired electrical communication between the first power source 110 and the end plates 104 without providing electricity to the elongate body 102.

As shown in FIGS. 2-3, the modular lighting fixture 100 can include the beam 106. The beam 106 can be adjustably coupled to both the first end plate 124 and the second end plate 126 via a fastener 132. It should be appreciated that the fastener 132 can be insulated from the beam 106 while providing wired electrical communication to the LED strip 108. The beam 106 can be parallel with the longitudinal axis (A) of the elongate body 102. The beam 106 can serve as a mounting platform for the LED strip 108. It should be appreciated that the modular lighting fixture 100 can include multiple beams 106 to accommodate various lighting requirements. The modular capability of the modular lighting fixture 100 allows for customization of the number of beams 106 based on the specific needs of the growing environment, with each beam 106 capable of supporting at least one LED strip 108. The beam 106 can be electrically connected to the end plates 104 through the fastener 132. A skilled artisan can select a suitable number of beams 106 to achieve the desired light distribution and intensity. The modularity of the modular lighting fixture 100 can provide a user with the flexibility to customize the lighting setup by adding or removing beams 106 as needed, while maintaining the benefits of the power delivery system and IP67-rated connections of the modular lighting fixture 100. The ability to incorporate multiple beams 106 enhances the versatility of the modular lighting fixture 100, allowing the user to adapt the modular lighting fixture 100 to various CEA configurations while preserving the simplified maintenance and interchangeability features of the LED strip 108 through the end plate 104 power delivery system.

The beam 106 can be removably coupled to both the first end plate 124 and the second end plate 126 via the fastener 132, which can be electrically conductive to allow for wireless electrical communication between the fastener 132 and the end plates 104. The fastener 132 can be disposed at each end of the beam, as shown in FIGS. 1-3, to allow for the beam 106 to be coupled to the first end plate 124 and the second end plate 126. Additionally, the fastener 132 in wireless electrical communication with the first end plate 124 can have a positive charge while the fastener 132 in wireless electrical communication with the second end plate 126 can have a negative charge. As an example, the fastener 132 can include a threaded screw. A skilled artisan can select a suitable fastener 132 within the scope of the present disclosure. The fastener 132 can serve dual purposes by providing both mechanical and electrical functionality. Mechanically, the fastener 132 can allow for easy adjustment of the LED strip angles by loosening and tightening the fastener 132. Electrically, the fastener 132 can be conductive, providing electrical communication between the fastener 132 and the end plates 104, militating against the need for direct wiring between the beam 106 and the end plates 104.

As shown in FIG. 1, the fastener 132 can be coupled to a knob 134 disposed on an outer surface of the end plates 104. The knob 134 can be used to adjust or remove the fastener 132 to allow for the adjustment or movement of the beam 106. A skilled artisan can select a suitable means for adjusting the fastener 132 within the scope of the present disclosure.

Figure 4:
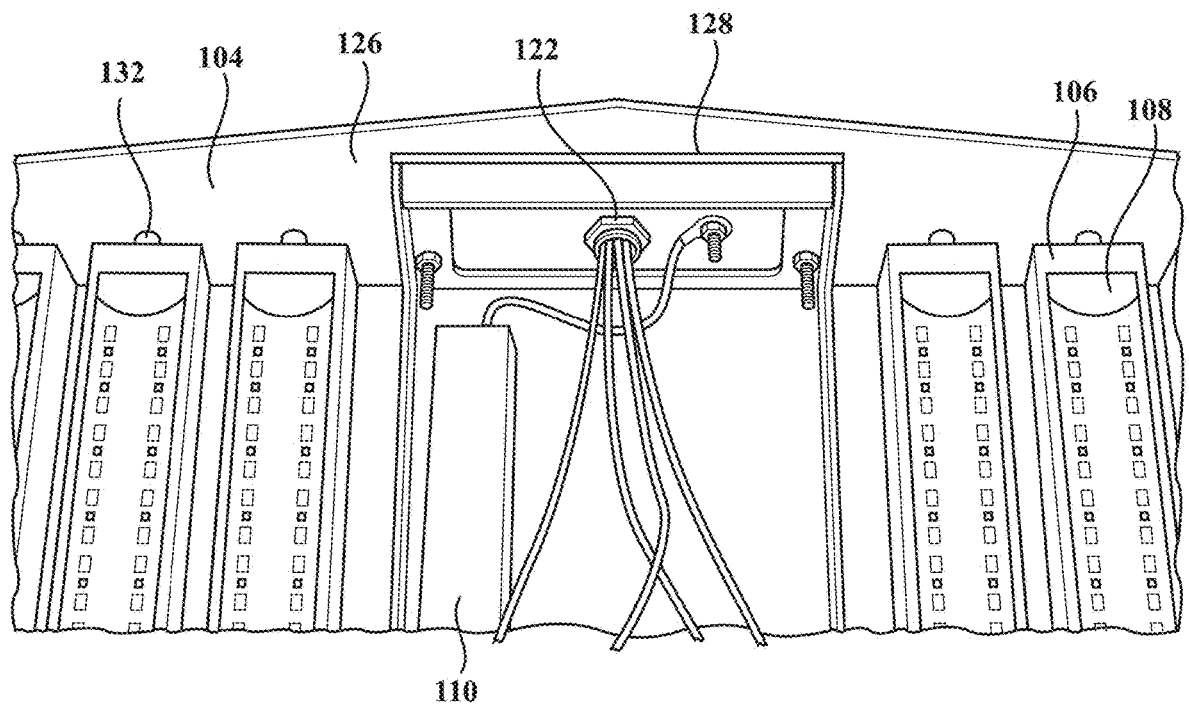
FIG. 4 is an enlarged fragmentary top perspective view depicting an end plate coupled to the elongated body via a connector.
Figure 5:
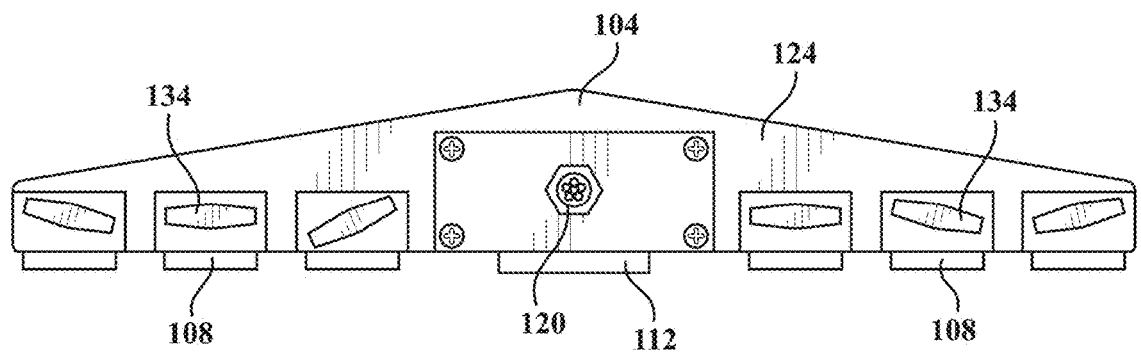
FIG. 5 is a front elevational view of the end plate and the connector.

With reference to FIGS. 4 and 5, the fastener 132 can be disposed through a wall of the beam 106 such that a portion of the fastener 132 can be disposed within the beam 106 and another portion of the fastener 132 can be disposed through the end plate 104. In this way, the fastener 132 can provide wireless electrical communication between the end plate 104 and the interior of the beam 106. Within the beam 106, a wired connection can electrically couple the fastener 132 and the LED strip 108. However, it should be appreciated that the end plates 104 and fastener 132 can be in wireless electrical communication, which allows the beam 106 and the LED strip 108 to be easily removed from the modular lighting fixture 100 for replacement or servicing.

Figure 6:
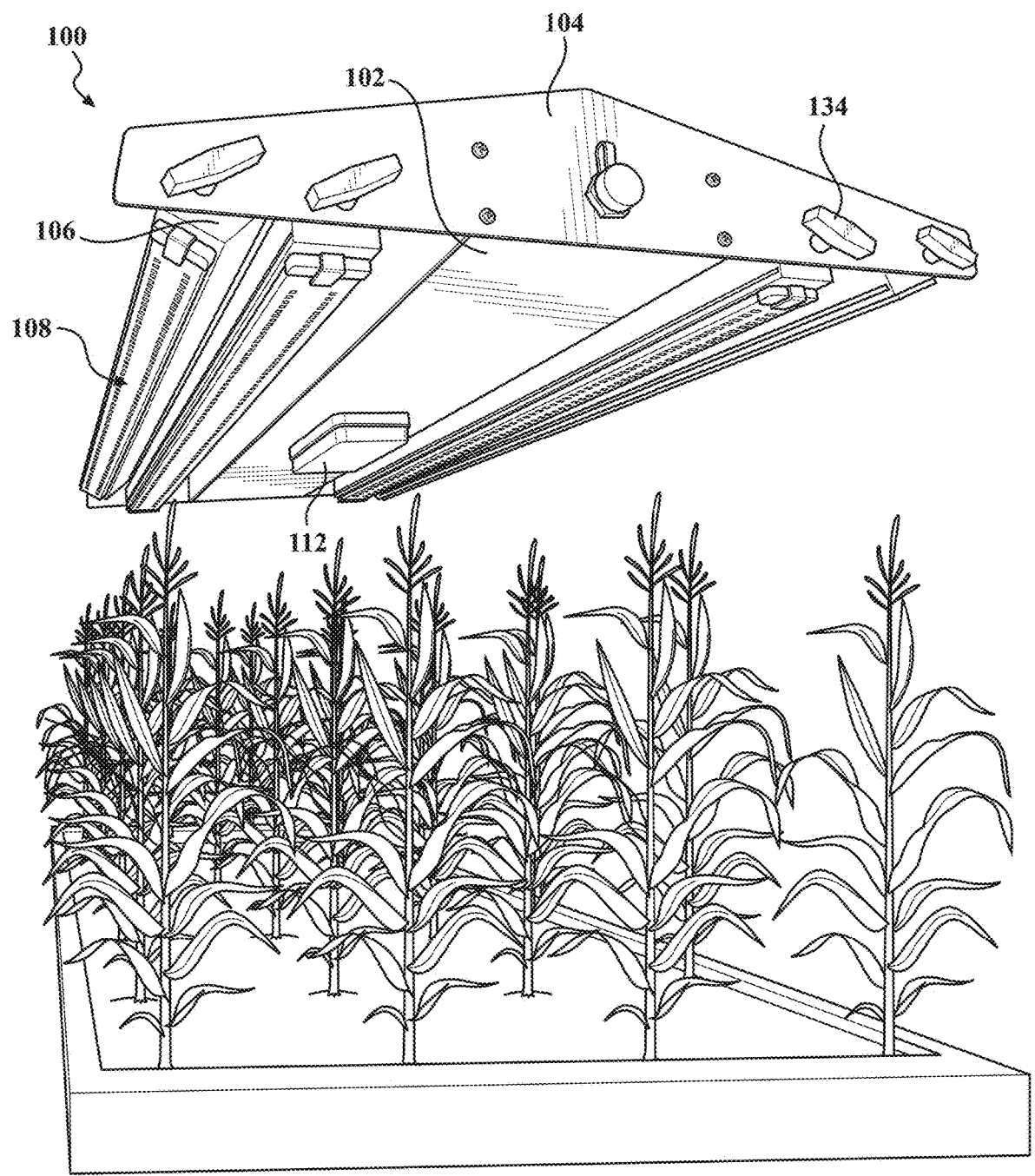
FIG. 6 is an environmental view of another embodiment of the modular lighting fixture providing LED light and stroboscopic light to plants in controlled environment agriculture (CEA)

As described herein and shown in FIG. 6, the beam 106 can be adjusted using the fastener 132 to allow for modification of an angle at which the LED strip 108 is disposed relative to the plant. Advantageously, the beam 106 and, therefore the LED strip 108, can be moved to the angle that provides for optimized light distribution for plant growth. As an example, the beam 106 can be rotated 360° with respect to the attachment points of the fasteners 132 while remaining in electrical communication with the first power source 110 to allow for the LED strip 108 to shine light upon a plant positioned at any location around the modular light fixture 100, enabling broad light spread to cover larger areas or reach plants at the periphery of the modular lighting fixture 100. It should be appreciated that in an example where the modular lighting fixture 100 includes more than one beam 106 and LED strip 108, each beam 106 can be positioned at a different angle to allow for a plant below the modular lighting fixture 100, on a side of the modular lighting fixture 100, or above the modular lighting fixture 100 to receive light.

With renewed reference to FIG. 3, the LED strip 108 can be mounted to the beam 106. In an example, the LED strip 108 can be mounted to the beam 106 via a double-sided adhesive. The LED strip 108 can have varying dimensions to accommodate different operational needs. For example, the LED strip 108 can span a length of the beam 106 for maximum light coverage, or the LED strip 108 can be sized smaller to conserve energy while still providing adequate illumination for specific growing requirements. A skilled artisan can select a suitable configuration for the LED strip 108 on the beam 106 within the scope of the present disclosure. The LED strip 108 can be in wired electrical communication with the fasteners 132 to complete the electrical circuit and power the LED strip 108.

It should be appreciated that the power delivery system for the LED strip 108 follows the electrical path as described herein. The first power source 110 can be in wired electrical communication with the connectors 120, 122 and the connectors 120, 122 can be in wireless electrical communication with the end plates 104. Each end plate 104 can be in wireless electrical communication with the fastener 132 disposed at the respective ends creating a charge at each fastener 132. Each fastener 132 can be in wired electrical communication with the LED strip 108 through the beam 106 whereby the electrical circuit is complete. It should be appreciated that the beam 106 can include an aperture for the both the negative wire from the fastener 132 connected to the negative LV second end plate 126 and the positive wire from the fastener 132 connected to the positive LV first end plate 124 within the beam 106 to be connected to the LED strip 108. In certain embodiments, the beam 106 can include an aperture at each end of the beam 106 to allow for the negative wire from the fastener 132 connected to the negative LV second end plate 126 to be disposed adjacent the negative LV second end plate 126 and the positive wire from the fastener 132 connected to the positive LV first end plate 124 to be disposed adjacent the positive LV first end plate 124.

The LED strip 108 can include a high-output LED capable of delivering a broad range of light intensities, typically measured in photosynthetic photon flux density (PPFD). In certain embodiments, the LED strip 108 can include multiple high-output LEDs to allow for greater light output. As an example, the PPFD for the high-output LED can range from about 100 micromoles per square meter per second to about 1000 micromoles per square meter per second. A skilled artisan can select a suitable PPFD within the scope of the present disclosure. The LED strip 108 can operate across various power outputs, from as low as about 10 watts for energy conservation up to about 100 watts or more for maximum brightness, for example.

The LED strip 108 can be interchangeable and can be customized for different spectral outputs, spanning wavelengths from deep blue (around 400 nm) through the full photosynthetically active radiation (PAR) spectrum (about 400-about 700 nm) and into far-red (up to about 730 nm). The LED strip 108 can also be dimmable through a primary voltage circuit 136, shown in FIG. 7, allowing control over lighting intensity to suit various plant growth stages.

The electric circuitry configuration of the modular lighting fixture 100 enables easy removal and replacement of the LED strip 108 via the beam 106 without disconnecting a wired electrical connection. The beam 106 and the fastener 132 can be wirelessly removed from the modular lighting fixture 100 allowing for another fastener 132 and another beam 106 to be installed in the place of the removed beam 106 and fastener 132 quickly and without wire installation.

With reference to FIG. 3, the first power source 110 in the modular lighting fixture 100 can power the LED strip 108 through the connectors 120, 122, end plates 104 and the fasteners 132. As an example, the first power source 110 can include a 24V LED power supply that provides voltage for operating the LED strip 108. It should be appreciated that the first power source 110 can provide power to multiple LED strips 108 through multiple beams 106, as desired. It should also be appreciated that the power source 110 can be placed in electrical communication with a source of electrical energy utilizing common electrical plugs and cords, or wired directly to the power source.

As shown in FIGS. 1 and 3, the stroboscopic light source 112 can be integrated with the elongate body 102 and can operate independently from the LED strip 108 through the second power source 114. In certain embodiments, the stroboscopic light source 112 can be disposed on an exterior surface of the elongate body 102 to allow for the stroboscopic light produced by the stroboscopic light source 112 to emit from the modular light fixture 100 to the plant. As an example, the stroboscopic light source 112 can have a light spectrum ranging from about 50 nanometers in the ultraviolet range through the visible spectrum and reaching into the far-infrared range up to about 2200 nm. The broad-spectrum coverage can ensure the plant receives both essential photosynthetic wavelengths and beneficial wavelengths that influence growth-regulating mechanisms. The stroboscopic light source 112 can deliver light intensity, with peak output exceeding about 100,000 candela, providing deep light penetration for reaching inner plant foliage layers. The stroboscopic light source 112 can operate with frequency control, ranging from about 25 to about 150 cycles per minute, with exposure durations that can be adjusted from 50 to about 500 microseconds per pulse to accommodate the needs of different plant species, for example.

As an example, the stroboscopic light source 112 can deliver a photosynthetic photon flux ranging from about 1,000 micromoles to about 20,000 micromoles per second, with adjustable wattage output from about 3 watts to about 4000 watts. The flexibility allows for optimization of light delivery while managing energy efficiency. Advantageously, the stroboscopic light source 112 can achieve a high intensity output while operating at lower wattage levels.

It should be appreciated that the combination of the LED strip 108 and stroboscopic light source 112 in the modular lighting fixture can be beneficial for controlled environment agriculture. The dual lighting system allows for precise spectrum customization. The LED strip 108 can be tailored to emit specific wavelengths for different plant growth stages, while the stroboscopic light source 112 can provide an extensive spectrum from about 50 nanometers in the ultraviolet range through to about 2200 nm in the far-infrared range. The coverage ensures plants receive both essential photosynthetic wavelengths and beneficial wavelengths that influence growth-regulating mechanisms.

Additionally, the dual light system offers complementary intensity levels. While the LED strip 108 can provide consistent, dimmable lighting that can be adjusted through the primary voltage circuit, the stroboscopic light source 112 can deliver high-intensity light bursts exceeding about 100,000 candela. The combination enables deep canopy penetration while maintaining adaptable ambient lighting conditions and enhancing energy efficiency. The LED strip 108 can operate at lower power levels for routine lighting needs, while the stroboscopic light source 112 can deliver high-intensity illumination at reduced wattage compared to traditional agricultural lighting. The configuration allows for optimal light delivery while managing energy consumption.

Figure 8:
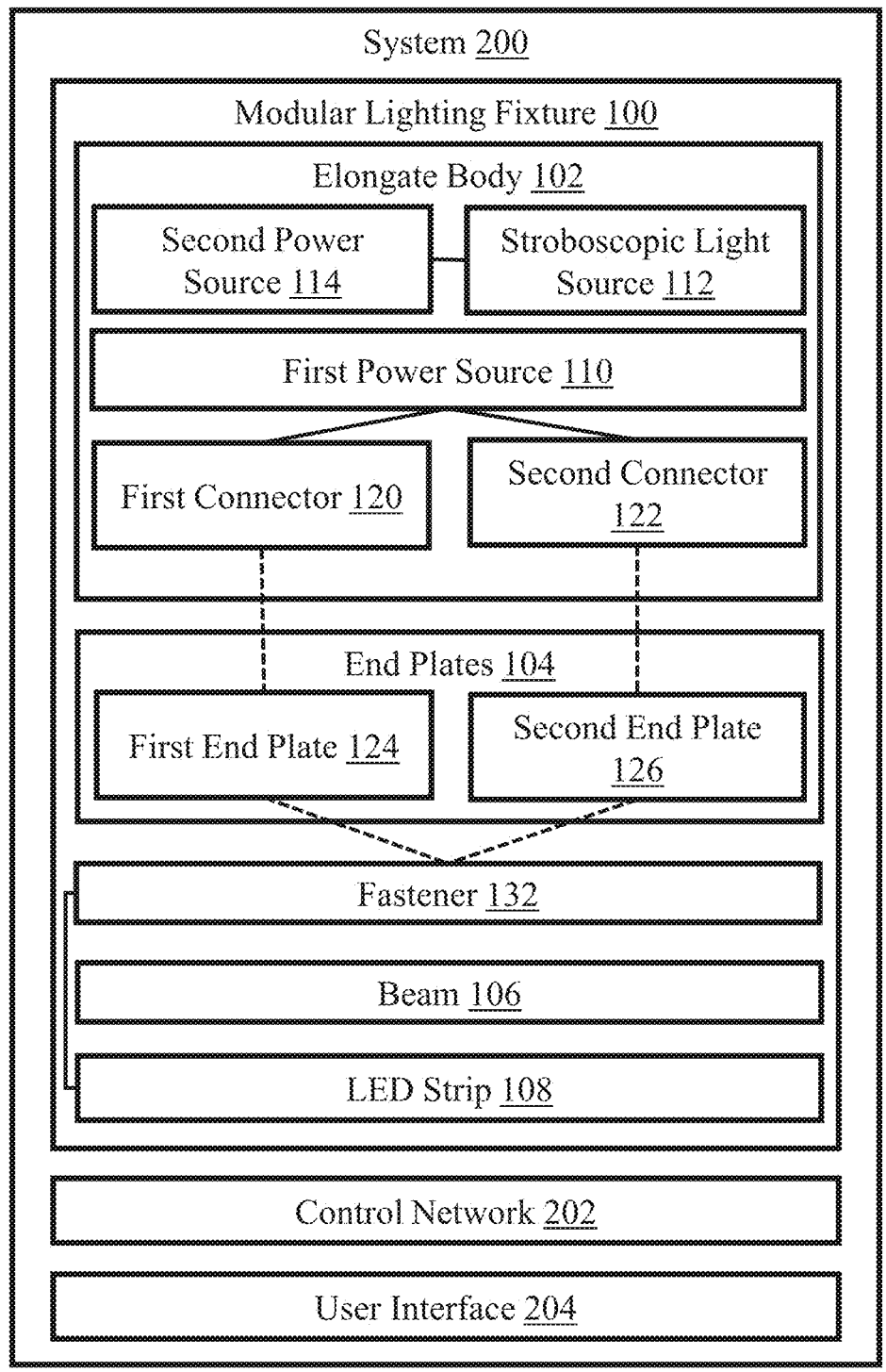
FIG. 8 is a schematic depicting a system for optimizing plant growth in CEA.

The present disclosure provides a system 200 for optimizing plant growth in CEA, shown generally in FIG. 8. The system 200 can include the modular lighting fixture 100, as described herein, a control network 202, and a user interface 204. The control network 202 can be configured to operate the modular lighting fixtures 100 in a synchronized manner, particularly the operation of the stroboscopic light source 112. The user interface 204, which can be communicatively coupled to the control network 202, allows users to exert control over the operation of the modular lighting fixture 100, including programming illumination schedules through a programmable timer. It should also be understood that the control network 202 and the user interface 204 can be configured to operate at least one modular light fixture 100, including synchronizing the operation of each one of the at least one modular light fixtures 100 or providing independent operation of one or more of the of the at least one modular light fixture 100.

The control network 202 can be also capable of adjusting the intensity of the LED strip 108 based on feedback from sensors that monitor plant growth stages. The control network 202 can adapt the frequency of flash of the stroboscopic light source 112 in response to the environmental conditions within the CEA. The inclusion of wireless connectivity within the control network 202 facilitates remote operation and monitoring of the modular lighting fixtures 100, while the user interface 204 provides real-time feedback on the performance and energy consumption of the modular light fixture 100.

The control network 202 can integrate with other environmental control systems within the CEA, coordinating lighting with other factors that influence plant growth. The modular lighting fixture 100 can be strategically arranged to ensure uniform light distribution across the growing area, and the control network 202 can utilizes a machine learning algorithm to refine lighting schedules based on historical plant growth data and predictive analytics.

An energy harvesting system within the control network 202 can capture energy from the ambient environment to power the modular lighting fixtures 100, enhancing the sustainability of the system 200. The user interface 204 can also include a virtual reality (VR) or augmented reality (AR) module, enabling users to visualize the impact of lighting on plant growth within a simulated CEA environment.

The modular lighting fixture 100 can include a fail-safe mechanism that automatically adjusts light output in the event of a component failure, maintaining consistent plant growth conditions. The fail-safe mechanism can safeguard that plant growth is not adversely affected by an unexpected equipment malfunction. One of ordinary skill in the art may also select other suitable features for the system 200 within the scope of the present disclosure.

Figure 9:
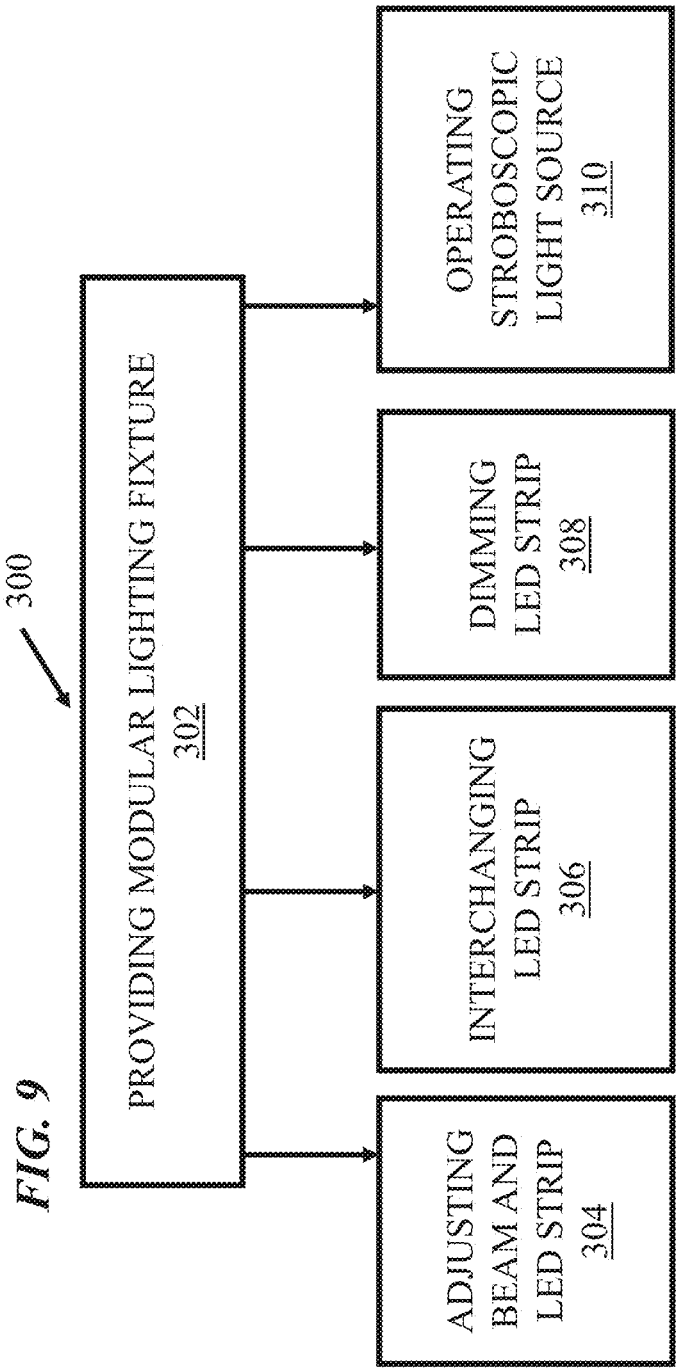
FIG. 9 is a flowchart depicting a method for optimizing growth of a plant in a CEA using the modular lighting fixture.

The present disclosure provides a method 300 for optimizing plant growth in controlled environment agriculture, shown generally in FIG. 9. The method 300 can include a step 302 of providing a modular lighting fixture 100, as described herein. The method can include at least one of a step 304 of adjusting an angle of the beam 106, a step 306 of interchanging the LED strip 108, a step 308 of dimming the LED strip 108, and a step 310 of operating the stroboscopic light source 112.

The step 304 of adjusting an angle of the beam 106 and the LED strip 108 to direct light toward the plant can include adjusting the knob 134 such that the fastener 132 and the beam 106 can rotate freely about the fasteners 132 the beam 106. As described herein, once the beam 106 is able to move freely, the beam 106 can be adjusted to direct light toward the plant. As an example, the beam 106 can be rotated 360° to allow for the LED strip 108 to shine light upon a plant positioned at any location around the modular light fixture, enabling broad light spread to cover larger areas or reach plants at the periphery of the modular lighting fixture 100. It should be appreciated that in an example where the modular lighting fixture 100 includes more than one beam 106 and LED strip 108, each beam 106 can be positioned at a different angle to allow for a plant below the modular lighting fixture 100, on a side of the modular lighting fixture 100, or above the modular lighting fixture 100 to receive light. Where the LED strip 108 is adjusted to the desired angle, the knob 134 can be adjusted to secure the fastener 132 and the beam 106 at the desired angle.

The step 306 of interchanging the LED strip 108 to customize a light spectrum provided to the plant can include adjusting the fastener 132 located at the ends of the beam 106 via the knob 134. By simply loosening the fastener 132 at each end, the user can remove the beam 106 and replace the beam 106 with another beam 106 without needing to make any wiring changes. Where the beam 106 is replaced, the knob 134 can be adjusted to secure the fastener 132 and the beam 106 at the desired angle establishing both physical mounting and the wireless electrical communication between the end plates 104 and the fastener 132.

The interchangeability of the beam 106 and the LED strip 108 can allow the user to swap different types of LED strips 108 to achieve specific spectral outputs based on cultivation needs. For example, the user can install an LED strip 108 that predominantly emits blue light (450-495 nm) when growing leafy greens or young plants, and interchange with another LED strip 108 that primarily emit red light (620-750 nm) when transitioning to flowering and fruiting stages.

The step 308 of dimming the LED strip 108 to control a light intensity can include dimming the LED strip 108 through the primary voltage circuit 136, which allows for precision over the lighting output to match various plant growth requirements and environmental conditions. The primary voltage circuit 136 can enable granular control over light intensity, allowing a user to fine-tune the illumination levels to suit specific growth stages and plant needs. The dimming capability operates through the primary voltage circuit 136 that is operatively connected to the LED strip 108, providing a direct means of adjusting light output.

It should be appreciated that the dimming control can be integrated into the control network 202 to allow the system 200 to adapt to various CEA conditions. Through the primary voltage circuit 136, the user can adjust light output based on feedback from sensors that monitor plant growth stages and environmental conditions.

The step 310 of operating the stroboscopic light source 112 to provide high-intensity light to the plant can include calibrating the stroboscopic light source 112 via the control network 202 to function across a versatile range from about 25 to about 150 cycles per minute. Each light pulse can be adjusted with exposure durations ranging from about 50 to about 500 microseconds, allowing customization based on plant species and specific light sensitivity requirements.

It should be appreciated that the stroboscopic light source 112 operates independently from the LED strip 108, powered through a separate power source and controlled through dedicated ports in the end plates. The independent operation allows for precise control over the high-intensity light delivery while maintaining the efficiency of the modular light fixture 100.

It should be appreciated that the modular lighting fixture 100 enables multiple method steps to be executed simultaneously or in coordinated sequences to achieve optimal plant growth conditions. For example, the LED strip 108 can be dimmed through the primary voltage circuit 136 while the stroboscopic light source 112 operates at specific frequencies and intensities, allowing for a combination of light delivery methods. The versatility of the modular lighting fixture 100 allows the user to adjust the angle of the LED strip 108 mounted on the beam 106 while simultaneously controlling intensity of the LED strip 108 through dimming, ensuring optimal light distribution and intensity throughout the growing area. The multi-faceted approach to light management can be beneficial by enabling the modular lighting fixture 100 to adapt to various growth stages and environmental conditions while maintaining energy efficiency. The control network 202 can coordinate multiple functions, allowing for synchronized operation of both the LED strip 108 and stroboscopic light source 112, with the ability to adjust and record parameters such as light output, flash frequency, and dimming levels based on plant growth cycles and environmental feedback.

EXAMPLES

The following examples are provided to illustrate various applications and implementations of the present disclosure. The examples are intended to be illustrative only and should not be construed as limiting the scope of the invention. Other applications, embodiments, and modifications within the scope of the present disclosure will be apparent to those skilled in the relevant art.

Example 1: Large-Scale Greenhouse Cultivation

In a large-scale greenhouse operation specializing in the cultivation of tomatoes, the modular lighting fixture 100 can be employed to enhance the growth and yield of the plants. The greenhouse can utilize an array of the modular lighting fixtures 100, each featuring an elongate body 102 with adjustable beam 106 that mount a high-output LED strip 108. The LED strip 108 can be customized to emit a spectrum that promotes vegetative growth in tomatoes, with a focus on the blue and red wavelengths that are most effective for photosynthesis. The LED strip 108 can also be dimmable, allowing a user to adjust the light intensity to match the natural light cycle, thereby reducing energy consumption during peak sunlight hours.

The pulsed stroboscopic light source 112 can be integrated within the module lighting fixture 100 and can provide supplemental high-intensity light, which can be beneficial during the darker months of the year. The light source can operate at a lower wattage than a HID lamp, yet deliver a comparable light output, ensuring that the plant receives adequate light without incurring excessive energy costs. The pulsed nature of the stroboscopic light source 112 also mimics natural sunlight patterns, providing intermittent bursts of light that penetrate deeper into the plant canopy, reaching lower leaves and promoting overall plant health.

The control network 202 connected to the modular light fixtures 100 allows for precise management of the lighting environment. The system 200 can be programmed to adjust the light output and flash frequency based on the growth stage of the tomato plants, with more intense light provided during the fruiting stage to boost fruit production. The user interface 204 can enable the user to monitor and adjust the lighting regime in real-time, responding to changes in weather conditions or plant growth patterns.

Example 2: Vertical Farming Operation

A vertical farming operation utilizes the modular lighting system 200 to grow leafy greens, such as lettuce and spinach, in a controlled indoor environment. The system 200 comprises multiple modular lighting fixtures 100 arranged vertically to maximize space utilization and light exposure to the plants on each level. The modular lighting fixtures 100 can be equipped with LED strips 108 that emit a spectrum optimized for leafy green growth, with an emphasis on the blue spectrum to encourage compact, bushy growth and vibrant green foliage.

The stroboscopic light source 112 can provide microdoses of intense light that enhance the photosynthetic efficiency of the plants. The stroboscopic light source 112 can be advantageous in the vertical farming setup, where natural light penetration is limited. The pulsed light ensures that each plant receives a burst of high-intensity light without overheating the surrounding environment, which is important in the densely packed vertical racks. It should be appreciated that in certain examples, there can be a plurality of the stroboscopic light sources 112 employed per modular lighting fixture 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A modular lighting fixture for controlled environment agriculture (CEA), comprising:
    an elongate body having a first connector disposed at a first end and a second connector disposed at a second end;
    end plates including a first end plate and a second end plate disposed adjacent to opposite ends of the elongate body, the first connector disposed through the first end plate and the second connector disposed through the second end plate, the first end plate in wireless electrical communication with the first connector and the second end plate in wireless electrical communication with the second connector, the end plates having a low voltage charge, the first end plate having an opposite charge of the second end plate;
    a beam removably coupled to the first end plate and the second end plate via a fastener, the fastener in wireless electrical communication with the end plates;
    a light emitting diode (LED) strip mounted to the beam and in wired electrical communication with the fastener;
    a first power source in wired electrical communication with the first connector and the second connector, the first power source for powering the LED strip;
    a stroboscopic light source disposed adjacent to the elongate body; and
    a second power source in wired electrical communication with the stroboscopic light source.

2. The modular lighting fixture of claim 1, wherein a gap is defined between each of the end plates and the elongate body.

3. The modular lighting fixture of claim 2, wherein the gap includes an insulator plate.

4. The modular lighting fixture of claim 3, wherein the insulator plate is formed from plastic.

5. The modular lighting fixture of claim 1, wherein the first end plate includes a positively charged end plate and the second end plate includes a negatively charged end plate.

6. The modular lighting fixture of claim 1, further including a primary voltage circuit operatively connected to the LED strip and configured to dim the LED strip.

7. The modular lighting fixture of claim 1, wherein the elongate body includes a hollow interior configured to house the first power source and the second power source.

8. The modular lighting fixture of claim 1, wherein the fastener includes a threaded screw.

9. The modular lighting fixture of claim 1, wherein the fastener is coupled to a knob disposed on an outer surface of the end plates.

10. The modular lighting fixture of claim 1, wherein the LED strip spans a portion of a length of the beam.

11. The modular lighting fixture of claim 1, wherein the beam includes an aperture for housing wiring between the fastener and the LED strip.

12. The modular lighting fixture of claim 1, wherein the beam includes an aperture at each end.

13. The modular lighting fixture of claim 1, wherein the end plates are disposed perpendicular with a longitudinal axis of the elongate body.

14. The modular lighting fixture of claim 1, wherein the elongate body is disposed centrally on each end plate forming an I-shaped structure.

15. The modular lighting fixture of claim 1, wherein the fastener is disposed through a wall of the beam.

16. The modular lighting fixture of claim 1, wherein the first connector and second connector are disposed centrally on the respective end plates.

17. The modular lighting fixture of claim 1, wherein the beam is disposed coplanar to a longitudinal axis of the elongate body.

18. The modular lighting fixture of claim 1, wherein the stroboscopic light source is disposed on an exterior surface of the elongate body.

19. A system for optimizing plant growth in controlled environment agriculture (CEA), comprising:
    at least one modular lighting fixture, each modular lighting fixtures including
        an elongate body having a first connector disposed at a first end and a second connector disposed at a second end,
        end plates including a first end plate and a second end plate disposed adjacent to opposite ends of the elongate body, the first connector disposed through the first end plate and the second connector disposed through the second end plate, the first end plate in wireless electrical communication with the first connector and the second end plate in wireless electrical communication with the second connector, the end plates having a low voltage charge, the first end plate having an opposite charge of the second end plate,
        a beam removably coupled to the first end plate and the second end plate via a fastener, the fastener in wireless electrical communication with the end plates,
        a light emitting diode (LED) strip mounted to the beam and in wired electrical communication with the fastener,
        a first power source in wired electrical communication with the first connector and the second connector, the first power source for powering the LED strip,
        a stroboscopic light source disposed adjacent to the elongate body, and
        a second power source in wired electrical communication with the stroboscopic light source;
    a control network configured to operate the at least one modular lighting fixture; and
    a user interface communicatively coupled to the control network, wherein the user interface is configured to allow user control over an operation of the at least one modular lighting fixture.

20. A method for optimizing growth of a plant in a controlled environment agriculture (CEA) using a modular lighting fixture, the method comprising:
    providing a modular lighting fixture including
        an elongate body having a first connector disposed at a first end and a second connector disposed at a second end, end plates including a first end plate and a second end plate disposed adjacent to opposite ends of the elongate body, the first connector disposed through the first end plate and the second connector disposed through the second end plate, the first end plate in wireless electrical communication with the first connector and the second end plate in wireless electrical communication with the second connector, the end plates having a low voltage charge, the first end plate having an opposite charge of the second end plate, a beam removably coupled to the first end plate and the second end plate via a fastener, the fastener in wireless electrical communication with the end plates, a light emitting diode (LED) strip mounted to the beam and in wired electrical communication with the fastener, a first power source in wired electrical communication with the first connector and the second connector, the first power source for powering the LED strip, a stroboscopic light source disposed adjacent to the elongate body, and a second power source in wired electrical communication with the stroboscopic light source; and at least one of:

adjusting an angle of the beam and the LED strip to direct light toward the plant, interchanging the LED strip to customize a light spectrum provided to the plant, dimming the LED strip to control a light intensity, and operating the stroboscopic light source to provide high-intensity light to the plant.

* * * * *